Figure 1:
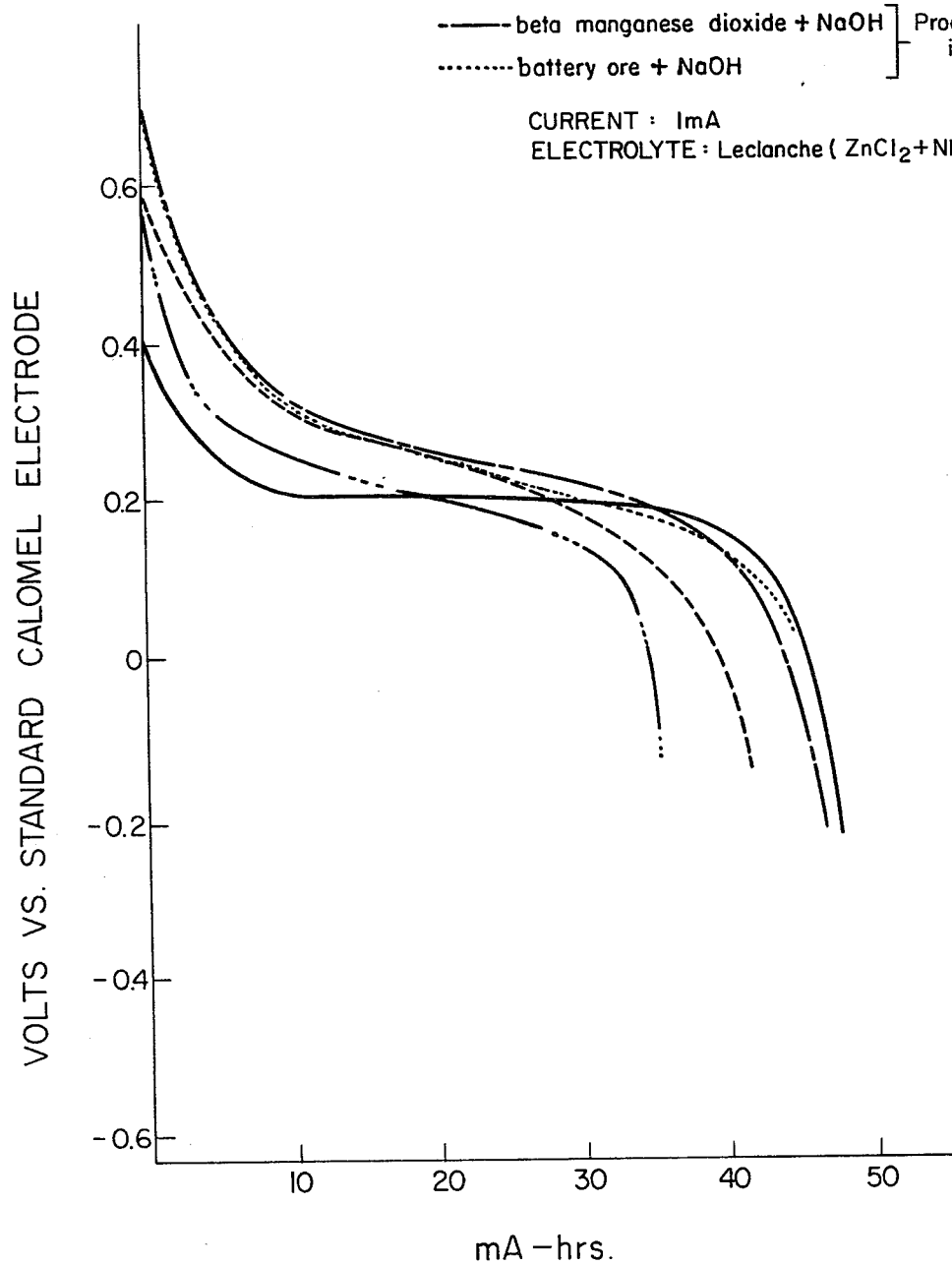

United States Patent [19]

Mellors et al.

[11] 4,277,360
[45] Jul. 7, 1981

[54] MANGANESE DIOXIDE

[75] Inventors: Geoffrey W. Mellors, North Royalton; Glenn W. Sheffield, Strongsville, both of Ohio

[73] Assignee: Union Carbide Corporation, New York, N.Y.

[21] Appl. No.: 24,596

[22] Filed: Mar. 28, 1979

[51] Int. Cl.³ .................... H01M 4/88; C01G 45/02
[52] U.S. Cl. ................................ 252/182.1; 423/49; 423/605; 429/224
[58] Field of Search ............... 423/605, 49; 429/224; 252/182.1

[56] References Cited

U.S. PATENT DOCUMENTS

| 1,259,099 | 3/1918 | Holmes |  |
|---|---|---|---|
| 1,275,666 | 8/1918 | Ellis et al. | 423/605 |
| 1,303,911 | 5/1919 | Jorgensen |  |
| 1,988,799 | 1/1935 | Kato | 423/605 |
| 2,885,262 | 5/1959 | Fleischer et al. | 423/605 |
| 3,427,126 | 2/1969 | Schmier | 423/605 |

FOREIGN PATENT DOCUMENTS

| 195524 | 2/1908 | Fed. Rep. of Germany |
| 500806 | 2/1939 | United Kingdom |
| 569217 | 5/1945 | United Kingdom |

OTHER PUBLICATIONS

Kozawa et al., "Electrochemical Technology", vol. 5, 1967, pp. 535-542.
Gattow et al., "Zeit. fur Amorg. & Allgem. Chemie", vol. 309, 1961, pp. 121-150.
"X-Ray Diffraction Key to the Manganese Oxide Minerals", E. J. Lavino & Co., Philadelphia, Pa., 1964.
Mellor, "Comprehensive Treatise on Inorg. & Theo. Chemistry", vol. 12, 1932, Longman Green & Co., N. Y. p. 261.
Wells, "Structural Inorganic Chemistry", Clarendon Press, Oxford, 1962, pp. 472-473.
Glemser, "Berichte", vol. 72B, 1939, pp. 1879-1881.
Butler et al., "Jour. of the Electrochem. Soc." vol. 100, 1953, pp. 297-301.
Cole et al., "Transactions of the Electrochem. Soc.", vol. 92, 1947, pp. 133-158.
Parant et al., "J. of Solid State Chem.", vol. 3, 1971, pp. 1-11, (pp. 1-23 of Translation).

Primary Examiner—Herbert T. Carter
Attorney, Agent, or Firm—Cornelius F. O'Brien

[57] ABSTRACT

A homogeneous manganese dioxide composition having on a microscopic scale domains of alpha and delta manganese dioxide is manufactured by reacting a manganese-oxygen containing composition with a sodium containing composition at elevated temperature followed by acid treatment.

8 Claims, 2 Drawing Figures

MANGANESE DIOXIDE

This invention relates to a new form of manganese dioxide and a method for preparing the same. In particular this invention relates to a homogeneous manganese dioxide composition having on a microscopic scale domains of alpha and delta manganese dioxide, which is manufactured by reacting a manganese-oxygen containing composition with a sodium containing composition at elevated temperature followed by acid treatment.

Manganese dioxide ($MnO_2$) is a well-known substance commonly used in electrochemical cells, such as dry cell batteries, as an active cathode material. Manganese dioxide has been known to exist in various crystalline forms among which pyrolusite is commonly found in nature. Ramsdellite is also found in nature, but to a lesser extent. Other forms of manganese dioxide are known, either naturally occurring or man-made, but none of these alone or in combination are homogeneous materials having on a microscopic scale domains of alpha and delta manganese dioxide. However, if one speaks of stoichiometric manganese dioxide with a manganese-oxygen atomic ratio of exactly 1:2, then probably only two of the many "manganese dioxide" materials correspond fully to this condition, namely pyrolusite (the beta form of manganese dioxide) and ramsdellite (a naturally occurring mineral). It has not proved possible to synthesize ramsdellite, and this material may be considered as a perfectly crystallized and pure gamma manganese dioxide. There is no sharp line of demarcation between the impure forms of manganese dioxide related to ramsdellite or the poorly crystallized varieties of pyrolusite. Between the end members, a continuous series exists of active, impure (i.e., $Mn:O > 1:2$) but homogeneous substances with distorted space lattices. To name and distinguish each member of the series, even if possible, would be most difficult and unrewarding.

Many of the useful battery ores, for example those derived from the African Gold Coast ores, have for many years been called gamma managanese dioxide and are closely related to ramsdellite. Indeed, Cole, Wadsley and Walkley (*Transactions of the Electrochemical Society*, volume 92, 133, 1947) conclude that gamma manganese dioxide is derived from ramsdellite rather than pyrolusite. Glemser's designation of an impure material as gamma manganese dioxide (*Berichte*, volume 72B, 1879-81, 1939) is particularly unfortunate, though, as stated above, the name has conveniently served to designate a certain class of manganese oxides having superior battery properties.

We can define the aforementioned prior art battery materials as homogeneous structures having on a microscopic scale domains of beta and gamma manganese dioxide. This description can be extended to define the material of this invention as having domains of alpha and delta manganese dioxide on a microscopic scale but possessing a homogeneous nature overall. In using the term "microscopic" in this description, it is understood to refer to dimensions in the tens to hundreds of angstrom units range which would be resolvable by high resolution electron microscopy. By "homogeneous" we imply that the manganese dioxide composition of this invention is not separable into independent materials and is a three dimensional network structure. Three dimensional network structures such as found in many forms of manganese dioxide are described by Wells in "Structural Inorganic Chemistry" (3rd ed., 1962, pp. 472-3).

Alpha manganese dioxide, which is normally found in a series of minerals (e.g. hollandite, cryptomelane, and coronadite), is composed of doubled $MnO_6$ octahedra with the general formula $A_{2-y}B_{8-z}X_{16}$, where A represents large ions such as $Ba^{2+}$, $Pb^{2+}$ or $K^+$, B is $Mn^{4+}$, $Fe^{3+}$ or $Mn^{2+}$, and X is $O^{2-}$ or $OH^-$. In the compounds studied and reported in this reference, $0.8 < y < 1.3$ and $0.1 < z < 0.5$. It is evident that, in these open structures, some large ions are necessary to prevent collapse of the network.

Delta-$MnO_2$ is a layer structure consisting of sheets of $MnO_6$ octahedra separated by about 7 Å, the intervening space often containing $OH^-$, $H_3O^+$, $Na^+$ or $K^+$, or $Mn^{2+}$. In a sense, this compound represents results of the breakdown of alpha manganese dioxide with removal of double $MnO_6$ units in one direction.

X-ray diffraction data for the manganese dioxide composition of this invention show lines of both the alpha and delta forms of manganese dioxide, the number of lines and relative intensities varying with the proportions of the reactants in the preparation, as will be described later. Thus, this new manganese dioxide is thought to be a previously undiscovered intermediate structure somewhat analogous to those that exist between beta manganese dioxide and ramsdellite.

In accordance with the present invention there is provided a new crystalline manganese dioxide composition which is homogeneous and has on a microscopic scale domains of alpha and delta manganese dioxide.

In accordance with the present invention there is also provided a method for making the manganese dioxide composition of this invention which encompasses reacting a sodium containing composition with a manganese-oxygen containing composition at elevated temperature to form a reaction product which is then acid treated to form the manganese dioxide composition of this invention, details of which are described more fully hereinafter. The formation of the manganese dioxide composition of this invention may be accomplished by three alternative embodiments of the method of this invention. The first method embodiment encompasses reacting a manganese-oxygen containing composition with the sodium containing composition by mixing together, such as by milling the two, preferably dry, materials and heating; the second and preferred embodiment encompasses forming a slurry of the sodium containing composition and the manganese-oxygen containing composition with a minimum of water and heating; the third embodiment encompasses fusing together the sodium containing composition and the manganese-oxygen containing composition; and then followed in all three embodiments by acid treatment. The manganese dioxide composition of this invention may then be water washed to remove excess acid and other impurities and then dried. It is also desirable to cool the reaction product before acid treatment in order to prevent splattering. An optional washing step may also be employed just prior to acid treatment.

Suitable manganese-oxygen containing compositions for use in the method embodiments of this invention preferably include, but are not limited to, any of the previously known forms of manganese dioxide, including, but not limited to pyrolusite, ramsdellite, nsutite, as well as other manganese and oxygen containing minerals or compounds having manganese-oxygen bonds, such as hollandite, cryptomelane, psilomelane, todorokite, chalcophanite, lithiophorite, birnessite, groutite, manganite (MnOOH), feitknechtite, pyrochroite, bixbyite ($\alpha$-$Mn_2O_3$), hausmannite ($Mn_3O_4$), manganosite (MnO), and also $MnCO_3$, which occurs naturally as rhodochrosite, as well as mixtures of any of the foregoing substances.

Suitable sodium containing compositions for use in the method embodiments of this invention include sodium hydroxide, sodium carbonate, sodium oxide, and mixtures thereof. Preferably sodium hydroxide is employed.

There are a number of factors within the method embodiments of this invention that can be varied. The proportion of sodium containing composition used can be varied in the range, based on the mole ratio of sodium in the sodium containing composition to moles of manganese in the manganese containing composition, from about 0.3:1.0 to about 4.0:1.0, preferably from about 0.5:1.0 to about 1.0:1.0, and more preferably about 0.75:1.0. The temperature at which the sodium containing composition is reacted with the manganese-oxygen containing composition can be varied in the range from about 200° C. to about 600° C., but temperatures in the range from about 280° C. to about 500° C. are preferable. At the lower temperature longer reaction times are required to recover at least 85% of the starting manganese values as the manganese dioxide of this invention, for example, as long as 16 hours may have to be employed at 280° C. and as short as 8 minutes at 500° C. The initial mixing of the sodium containing composition and the manganese-oxygen containing composition can be accomplished in several ways. Dry powders of the two substances can be milled together in a Waring blender or other suitable apparatus, or preferably a slurry of the sodium containing composition and the manganese-oxygen containing composition can be prepared with a minimum amount of water. Either mixture can then be heated to an appropriate temperature as indicated above. Another less preferable alternative is to fuse the appropriate amounts of the manganese-oxygen containing composition and the sodium containing composition together without prior mixing.

After heating the sodium containing composition and the manganese-oxygen containing composition together, the reaction product is preferably cooled to a temperature low enough to prevent splattering during the subsequent aqueous treatment step.

The cooled reaction product is then acid-treated with an aqueous acid such as, but not limited to, nitric acid, sulfuric acid, hydrochloric acid, and mixtures thereof, in a concentration and amount sufficient to reduce the sodium content of the final manganese dioxide decomposition of this invention to an amount in the range of from about 0.1 to about 2.0% by weight, preferably about 0.7 to about 1.25% by weight on a dry basis. One way to ensure a low and desirable sodium content is to adjust the pH to 2 in the initial acid washing. The acid treated product contains the manganese dioxide composition of this invention which is homogeneous and has on a microscopic scale domains of alpha and delta manganese dioxide. Optionally, the cooled reaction product may be washed, such as with water, prior to the acid treatment step.

Excess acid and acid-soluble impurities such as silicates, aluminates, and compounds of sodium and iron, may then be removed from the acid treated product by conventional methods, such as water washing. The acid treated, water washed product may then be dried by conventional methods such as air drying. The dried product is friable and easily dispersed.

It has long been known that manganese dioxide may be reacted with potassium hydroxide in the presence of air and water at 400°–450° C. to form a green material containing predominantly hexavalent manganese as $K_2Mn^{VI}O_4$, according to the reaction: $MnO_2+(\frac{1}{2})O_2+2KOH\rightarrow K_2MnO_4+H_2O$. Further oxidation to heptavalent manganese forms the basis for the large-scale production of potassium permanganate, an important commercial product. This oxidation to $KMnO_4$ was formerly carried out by bubbling air or even $CO_2$ through an alkaline solution of $K_2MnO_4$ but is now more commonly accomplished electrolytically.

It is less well known that there are large differences between the behavior of NaOH and KOH in the above reaction. Thus, attempts to prepare $NaMnO_4$ by a similar route resulted in poor yields, and it was thought that the blue solution (rather than the green solution obtained in the case of $KOH/MnO_2$) contained $Mn^V$ and this did not readily oxidize to heptavalent manganese.

It is important to note that in the aforementioned industrial processes that the ratio of alkali hydroxide-to-manganese dioxide was at least 2 to 1, and it was actually desirable to have an even greater excess of alkali. As the alkali hydroxide to manganese dioxide ratio is decreased, the yield of higher valency materials is decreased.

It must still be emphasized that the course of the reaction is fundamentally different when using NaOH rather than KOH, and it is to the use of NaOH that the discussion and description here is directed. This discussion is not limited to pyrolusite; any modification of $MnO_2$ and some lower valency oxidic manganese compounds can be employed, as mentioned earlier.

During the investigation leading to the subject invention, NaOH and pyrolusite (beta manganese dioxide) were heated together in various ratios over a temperature range of 200° to 600° C. On heating NaOH with pyrolusite (beta manganese dioxide) in a 1:1 molecular ratio at about 500° C., it was unexpectedly found that the reaction product, a manganese dioxide precursor which was a dark brown-to-black powder, if treated with acid, washed and dried, resulted in a high yield of the manganese dioxide composition of this invention (in most cases 90–95% based on the weight of the original material). The final manganese dioxide material was suitable, when mixed with graphite, acetylene black, etc., for use as a battery cathode material.

A test method that was used to very clearly demonstrate the superior electrochemical activity of the manganese dioxide of this invention is described by A. Kozawa and R. A. Powers (*Electrochem. Tech.*, volume 5, 535, 1967). A compressed mixture of 0.100 g of manganese dioxide+2.00 g acetylene black+1.00 g of graphite is force-discharged at 1 mA in a cell equipped with a counter electrode and a calomel reference electrode, as described in the above-identified publication. The electrolyte may be the Leclanche type ($NH_4Cl+ZnCl_2$) or $ZnCl_2$ alone. In FIG. 1 is shown the performance of pyrolusite, a typical battery grade manganese dioxide, an electrodeposited $MnO_2$ (EMD) product, and products made from pyrolusite and battery grade manganese dioxide, by the subject process. It is seen that the performance of both pyrolusite and a battery grade manganese dioxide are enhanced considerably so that the behavior of the upgraded material closely approximates that of an electrolytically deposited manganese dioxide material in this test.

There are a number of factors within the preparative system which can be varied. The proportion, for example, of NaOH (or $Na_2O$) can be varied from a mole ratio of Na:Mn of about 0.3:1.0 to about 4.0:1.0, and preferably a ratio of about 0.5:1.0 to about 1.0:1.0 Na:Mn, and more preferably about 0.75:1.0. The fact that sodium hydroxide does not easily lead to the formation of undesirably higher valency manganates, even in the presence of air under these reaction conditions, thus permits the use of higher Na:Mn ratios. The temperature can be varied in the range from about 200° C. to about 600° C., but temperatures of from about 280° to about 500° C. are preferable. At the lower temperatures longer times are required; for example, as long as 16 hours has been employed at 280° C., and as short 8 minutes at 500° C. The initial mixing of NaOH and manganese dioxide, for example, can be accomplished in several ways: the dry powders can be milled together in a Waring blender or similar apparatus or more preferably a slurry of NaOH and manganese dioxide with a minimum amount of water can be prepared. Either mixture can then be heated in an appropriate container to the required temperature for the correct time period under an air atmosphere. Another less preferable alternative is to fuse the appropriate amounts of manganese dioxide and NaOH together without prior mixing. The reaction product is then cooled, then acid treated, and washed and dried as described before.

It is important to examine the chemical nature of the products of these reactions. If NaOH and manganese dioxide, for example, in a 1:1 molecular ratio of Na:Mn are heated together, then water is eliminated, and a precursor material of the manganese dioxide composition of this invention is produced which contains a small amount of higher valent manganate species but is mostly a tetravalent manganate $xNa_2O.yMnO_2$. The x-ray diffraction pattern of this precursor material is unidentifiable except that it bears some resemblance to a material first described by Parant et al (*J. Solid State Chem.*, volume 3, 1, 1971) which was a compound in the sodium-manganese-oxygen system made in a different fashion, $Na_{0.70}MnO_{(2+y)}$, where $0 \leq y \leq 0.25$. The x-ray diffraction pattern of this literature material has a 5.56 Å line with a relative intensity of 100 and has no other line of a relative intensity greater than 20. However, the precursor of the manganese dioxide composition of the subject invention has features in its x-ray diffraction pattern not present in the material described by Parant et al, and this means that, while the precursor may be related to the Parant et al material, it is not identical. Thus, while the phase described by Parant et al has the most intense line at 5.56 Å, the precursor described here also possesses, in addition to this most intense line, d-spacings at 7.0 Å, 6.1–6.2 Å, 4.3 Å, and 3.5 Å, and many lines below 3.0 Å. In some specimens there is evidence of very high d-spacings at 10.4 Å, and even at 12.0 Å.

In addition, chemical analysis of the precursor shows a valency never less than 3.90 for the manganese; whereas, the manganese of the Parant et al compound would vary in valency between 3.3 and 3.8, the limits of the composition being $0.35Na_2O.MnO_{1.65}$ and $0.35Na_2O.MnO_{1.90}$.

Further, the product of the Parant et al. process cannot be converted by the acid treatment of our process into the manganese dioxide composition of this invention.

The final manganese dioxide composition of the subject invention exhibits x-ray diffraction patterns with the d-spacings and relative intensity values $(I/I_o)$ as shown in Table I. The x-ray diffraction pattern of the manganese dioxide composition of this invention remains relatively constant over a large composition range of interest but is not uniquely ascribable to one or another of the well-known forms of manganese dioxide. It is this constancy of the diffraction pattern that leads one to the conclusion that the new material is in fact a separate and unique form of manganese dioxide.

The manganese dioxide composition of this invention exhibits some similarities to the alpha and delta forms of manganese dioxide, but it can be distinguished therefrom. Glemser (*Z. anorg. u. allgem. Chem.*, volume 309, 121, 1961) gave the following patterns as illustrations of various degrees of crystallinity of delta manganese dioxide as shown in Table II.

TABLE I

| d-Values and Relative Intensities of the Manganese Dioxide Composition of This Invention ||||||||||||||
| Na:Mn Ratios Used in Preparation of Manganese Dioxide Composition ||||||||||||||
| 1.3/1.0 || 1.1/1.0 || 0.9/1.0 || 0.8/1.0 || 0.75/1.0 || 0.7/1.0 || 0.5/1.0 ||
| d | $I/I_o$ | d | $I/I_o$ | d | $I/I_o$ | d | $I/I_o$ | d | $I/I_o$ | d | $I/I_o$ | d | $I/I_o$ |
|---|---|---|---|---|---|---|---|---|---|---|---|---|---|
| 7.27 | 100 | 7.04 | 100 | 7.04 | 100 | 6.99 | 70 | 7.09 | 75 | 7.11 | 70 | 7.04 | 80 |
|  |  |  |  |  |  |  |  | 6.91 | 75 |  |  |  |  |
| 4.90 | 10 | 4.96 | 70 | 4.98 | 70 | 4.94 | 50 | 4.85 | 50 | 4.94 | 50 | 4.97 | 60 |
| — | — | 4.29 | 5 | 4.27 | 30 | 4.47 | 20 | 4.47 | 50 | 4.40 | 20 | 4.42 | 30 |
| — | — | 3.84 | 5 | 3.83 | 5 | — | — | — | — | — | — | — | — |
| 3.56 | 10 | 3.44 | 5 | 3.44 | 5 | — | — | — | — | 3.52 | 10 | — | — |
| — | — | 3.12 | 60 | 3.13 | 65 | 3.12 | 100 | 3.11 | 90 | 3.12 | 70 | 3.13 | 50 |
| — | — | — | — | — | — | 2.60 | 80 | — | — | — | — | — | — |
| 2.46 | 40 | 2.40 | 80 | 2.40 | 80 | 2.41 | 90 | 2.40 | 100 | 2.40 | 100 | 2.40 | 100 |
| 2.18 | 20 | 2.15 | 50 | 2.15 | 40 | 2.16 | 30 | 2.28 | 10 | 2.14 | 20 | — | — |
| — | — | — | — | — | — | 1.96 | 10 | — | — | — | — | — | — |
| 1.82 | 40 | 1.83 | 20 | 1.83 | 20 | 1.82 | 20 | 2.15 | 30 | 1.83 | 5 | 2.16 | 40 |
| — | — | — | — | — | — | — | — | — | — | — | — | 1.83 | 20 |
| — | — | 1.64 | 10 | 1.64 | 10 | 1.63 | 20 | 1.82 | 10 | 1.63 | 10 | 1.63 | 10 |
| — | — | 1.54 | 20 | 1.54 | 15 | 1.54 | 15 | 1.62 | 20 | 1.54 | 10 | 1.53 | 20 |
| — | — | — | — | — | — | — | — | 1.54 | 15 | — | — | — | — |
| 1.41 | 10 | 1.43 | 15 | 1.43 | 15 | 1.43 | 15 | 1.43 | 15 | 1.43 | 15 | 1.43 | 40 |

TABLE II

|   | delta″ | delta′ | delta |
|---|---|---|---|
| S | 6.7 | 7.1 | 7.4 |
| M | 2.8–3.4 | 3.4–3.5 | 3.6 |

TABLE II-continued

|  | delta″ | delta′ | delta |
|---|---|---|---|
| S → M | 2.4 | 2.4 | 2.4 |
| M → W | 2.1–2.2 | 2.1–2.2 | 2.2–2.4 |
| W |  | 1.51–1.55 |  |
| S | 1.38–1.42 | 1.38–1.40 | 1.40 |
| W |  |  | 1.20 |

(The hyphenated values show line widths)
S = Strong (100)
M = Medium (50)
W = Weak (10)

The sample of our material (Table I) made using 1.3 moles NaOH to 1.0 moles $MnO_2$ has the fewest lines, but does not have the corresponding line intensities characteristic of the Glemser material and, in addition, possesses extra lines at 4.90 and 1.82. As the concentration ratio $NaOH/MnO_2$ is reduced, the intensity of the 4.90 line increases and other lines, not ascribable to delta manganese dioxide, although weak in intensity, are recognizable. However, there is other evidence of a chemical nature to distinguish our material from the deltas of the literature. Delta materials, including those described by Glemser, can be changed into other modifications of manganese dioxide upon treatment with mineral acid. For example, a potassium ion containing delta (one prepared from potassium permanganate by reduction) on treatment with 10% $HNO_3$ at 70° C. converts to alpha manganese dioxide (cryptomelane); whereas, a sodium ion containing delta manganese dioxide subjected to the same treatment changes to gamma manganese dioxide. The manganese dioxide composition of this invention does not so react and is stable to acid treatment, as is evidenced by an unchanged x-ray diffraction pattern after acid treatment.

The manganese dioxide composition of this invention which generally contains about 2 to about 5 wt. % water and about 0.1 to about 2.0 wt. % sodium, preferably about 0.7 to about 1.25 wt. % sodium might be compared structurally with potassium cryptomelane (alpha manganese dioxide). The manganese in cryptomelane is mostly tetravalent, although some divalent material is also present.

Parant et al prepared another material under 4 atmospheres of oxygen in the Mn-O-Na system described as $Na_{0.20}.MnO_2$, and they disclosed that the phases $Na_{0.20}.MnO_2$; $Na_{0.40}MnO_2$; and $Na_{0.44}.MnO_2$ were resistant to the action of water or dilute acids. The Parant et al compound $Na_{0.20}.MnO_2$ contains 5.02 weight percent sodium as compared with a maximum 0.1–2.0 wt. % sodium in the final washed and dried manganese dioxide composition of this invention. The Parant et al compound is described as a sodium cryptomelane with the d-spacings and relative intensities as shown in Table III.

TABLE III

X-ray Data For Parant et al Material

| $d_{obs.}$ (Å) | $Na_{0.20}MnO_2$ $d_{calc.}$ (Å) | $I/I_{o\ obs.}$ |
|---|---|---|
| 6.89 | 6.89 | 80 |
| 4.85 | 4.87 | 60 |
| 3.45 | 3.44 | 5 |
| 3.08 | 3.08 | 90 |
| 2.393 | 2.393 | 100 |
| 2.169 | 2.178 | 30 |
| 1.824 | 1.822 | 40 |
| 1.530 | 1.529 | 30 |
| 1.433 | 1.432 | 30 |
| 1.299 | 1.299 | 20 |
| 1.279 | 1.279 | 10 |

Comparison of these data with those of Table I shows certain similarities, but the manganese dioxide composition of this invention requires only a small amount of sodium ion to stabilize the structure. This is an entirely new observation which illustrates the unique nature of the manganese dioxide composition of this invention. The first x-ray line of the manganese dioxide composition of this invention is generally about d=7.0 Å and the 3.45 Å line is rarely observed. The line at 3.08 Å is absent; 3.12 Å being present as a strong line; 2.40 Å line is a strong line in alpha, beta, gamma, and delta manganese dioxide; 2.16 and 1.82 Å are common; but 1.64 Å is absent from the Parant et al compound.

Figure 2:
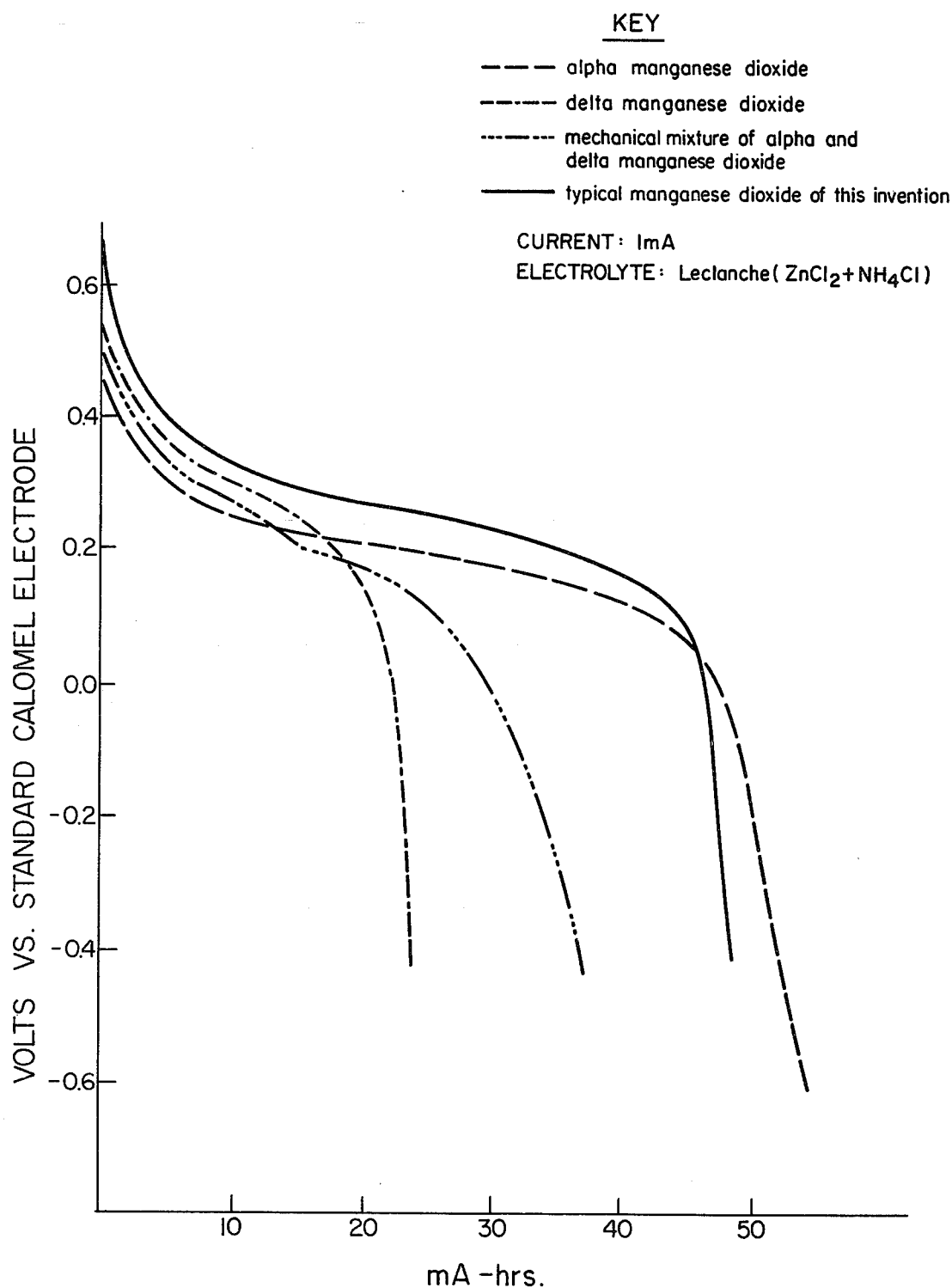

It appears that during the preparation of the manganese dioxide composition of this invention the course of the sodium hydroxide reaction with manganese dioxides of various structures proceeds as follows. The three-dimensional structure that exists in most manganese dioxide materials can be visualized as a series of layers of $MnO_6$ octahedra held apart by other $MnO_6$ octahedra, and the formation of our sodium manganate (IV) precursor can be seen as the removal of these tunnel supports. The structure is thus opened up and will then display, in the first instance, the characteristics of an alpha manganese dioxide which, in this case, is stabilized by only a small amount of sodium ion. As the reaction proceeds with higher ratios of Na:Mn, the approximation to a layer structure increases and there is a tendency for d-spacings characteristic of alpha manganese dioxide to be attenuated and the peaks of delta manganese dioxide to be enhanced. That this new manganese dioxide material is not a delta manganese dioxide is evidenced by the fact that it does not behave chemically and physically as known delta manganese dioxide in a direct comparison with samples of known delta manganese dioxide prepared by literature methods. On the other hand, the new material is not an alpha manganese dioxide either as described and known in the literature. It may best be described as a homogeneous material with domains of alpha and delta manganese dioxide; it is not a physical mixture since there is no method of separating the new material into two or more distinct constituents. A simple mechanical mixture of alpha and delta manganese dioxide using components synthesized by well-known literature methods does not exhibit all the properties of the new manganese dioxide composition. This can be demonstrated as follows: neither alpha nor delta manganese dioxide prepared by conventional methods is stable to heat, as is the new manganese dioxide material, and the behavior of typical alpha and delta materials in the 1-mA test discussed above is inferior to that of the new manganese dioxide material, as shown in FIG. 2.

The prior art discloses a number of manganese dioxides produced by methods superficially similar to the method of the subject invention and, therefore, to demonstrate the unique nature of the manganese dioxide composition of this invention, one must consider how the prior art materials differ from that of this invention.

In most of the pertinent prior art patents the starting material was referred to as "natural pyrolusite." There is no means of knowing the exact nature of the prior art manganese dioxide ores, because at the time of much of this prior work, little characterization of natural manganese dioxide materials had been attempted and, in fact, the usefulness of an ore was probably determined by its results when used as a cathode in a battery. Thus, in attempts to reproduce earlier results, both pyrolusite and other natural ores were employed.

Coppock and Grew (British Pat. No. 569,217) fused four parts of NaOH at 318° C., maintained it at the fusion temperature, and added three parts by weight of natural pyrolusite while vigorously stirring the mixture with an iron rod. This procedure was reproduced by us and, at the conclusion of the reaction, the product which was obtained was a dark-green powder. This product was ground and added to 6.5 parts of water, stirred until cold, filtered, and rewashed twice with water, as specified in Coppock and Grew's patent. The Na:Mn molecular ratio in the initial mixture was about 3 to 1.

The electrochemical performance in the 1-mA test described earlier is poor for the Coppock and Grew material, and the x-ray pattern shows delta manganese dioxide with only a small amount of pyrolusite (beta manganese dioxide). However, the precursor of this material (i.e., the product from the fusion prior to washing) is not the unique material made by the process of this invention, but rather, displays an x-ray pattern of many lines not readily ascribable to known species. It is most probable that the Coppock and Grew method produces some higher valent species (e.g., $NaMnO_4$ and $Na_2MnO_4$) which, upon washing and neutralization, disproportionate and by disproportionation thereby produce a delta manganese dioxide. This "disproportionation delta" (as we may term the Coppock and Grew material) does not behave as does the manganese dioxide composition produced by the method of this invention in electrochemical tests and, further, the Coppock and Grew materials differs considerably in surface area. In fact, areas of 7.1 $m^2/g$ (by the BET method with nitrogen) are obtained rather than the 25-60 $m^2/g$ characteristic of the manganese dioxide composition of this invention. Analyses indicate a sodium content of 11.38% rather than the 0.1-2.0 wt. % sodium characteristic of the manganese dioxide composition of this invention. The manganese dioxide content of the Coppock and Grew material is distinctly lower (about 63.75%) compared to at least about an 80-85% $MnO_2$ content for the manganese dioxide composition of the present invention.

In all probability, Coppock and Grew's material is a delta manganese dioxide produced by disproportionation of higher valency manganates, and if their material is heated for 24 hours at 70° C. with 10% nitric acid, there is some reversion to gamma manganese dioxide.

Jorgensen (U.S. Pat. No. 1,303,911) disclosed that, by adding "a comparatively small amount" of alkaline compounds, preferably alkali metal hydroxides, and heating at a red heat, he could upgrade manganese dioxide. "Red heat" is generally considered to be 700°-800° C., which would put his results outside the range of the process of this invention. His teachings were repeated by us and, since he did not specify how much alkali, it did not seem unreasonable to define a "comparatively small amount" as about 10 wt. % NaOH (the mole ratio 1Na:4Mn). At 800° C. (a bright-red heat), the method produced largely $Mn_2O_3$ and, while at 550° C. some delta manganese dioxide was obtained, the electrochemical performance of both specimens was abysmally poor. It is, of course, not surprising that the 800° C. specimen failed badly, but even with the delta manganese dioxide present in the specimen made at 550° C., electrochemical performance was poor.

There are a number of prior art patents involving autoclaving of concentrated sodium and potassium hydroxide solutions with manganese dioxide (e.g., Holmes, U.S. Pat. No. 1,259,099; Dieffenbach, German Pat. No. 195,524; and IGF, British Pat. No. 500,806), but probably all except Dieffenbach owe a great deal to the work of E. Krause (Thesis, University of Leipzig, 1907). Generally all of these studies involved autoclaving the aqueous alkali with $MnO_2$ at temperatures in the 180°-250° C. range at 3 to 10 atmospheres. Although "hydration" of $MnO_2$ was disclosed as the beneficial result of such treatment, this probably did not occur, but there may have been some surface activation. Certainly the material produced was not a delta manganese dioxide or an alpha manganese dioxide; neither is the precursor of the present invention obtained as an intermediate. In fact, the x-ray diffraction pattern of this prior art final material was generally that of pyrolusite, the starting material.

The manganese dioxide composition of the present invention is suitable for use in a number of applications where manganese dioxide has been employed in the past. The most extensive use of manganese dioxide has been in electrochemical cells, in particular in dry cell batteries, which typically comprise a manganese dioxide cathode, a zinc anode, and an aqueous electrolyte (such as aqueous $NH_4Cl$ and $ZnCl_2$ solutions). While the most widely used electrolytes in dry cells have been in aqueous form, the manganese dioxide composition of this invention is also useful with non-aqueous electrolytes such as those comprising organic solutions of light metal salts such as $LiBF_4$ in propylene carbonate-dimethoxyethane, or $LiAsF_6$ in methyl formate-propylene carbonate, and should also be useful with solid electrolytes such as lithium-substituted beta-alumina.

The following examples are set forth as being merely illustrative of the invention and are not intended, in any manner, to be limitative thereof. Unless otherwise indicated, all parts and percentages are by weight.

Examples I-IX illustrate the preparation of the manganese dioxide composition of the present invention.

EXAMPLE I 10 g NaOH was intimately mixed with 21.75 g pyrolusite (beta manganese dioxide) (Fisher Scientific Co. C.P. grade) and heated in a nickel crucible at 500° C. for 2 hours. The mole ratio of $NaOH:MnO_2$ was 1:1 and the reaction product that was formed was removed from the crucible after cooling, washed with water until the wash water effluent was free of color, adjusted to a pH of 2 with 15% sulfuric acid, water washed to remove excess acid, and dried at 110° C. overnight. Analysis of the product showed 57.06% Mn, 84.12% $MnO_2$, and a conversion value of 1.94. 80.9% of the original amount of $MnO_2$ was recovered. (The degree of conversion of Mn to $MnO_2$ may be expressed either as a percent peroxidation or as a value for x in the formula $MnO_x$. Peroxidation is the percentage of total Mn which is present as $MnO_2$.)

EXAMPLE II

An experiment similar to Example I carried out at 360° C. for 2 hours resulted in a material having an analysis of 56.97% Mn, 80.60% $MnO_2$, and a conversion value of 1.94, but 86.8% of the original amount of manganese dioxide was recovered.

EXAMPLE III

An experiment similar to Example I carried out at 280° C. for 5 hours resulted in a material having an analysis of 56.45% Mn, 82.15% $MnO_2$, and a conversion value of 1.93, but the recovery of $MnO_2$ was 93%.

EXAMPLE IV

An experiment using the same proportions of NaOH and pyrolusite as in the three prior examples above was carried out at 360° C. for 2 hours under an argon atmosphere. The analytical results showed 55.87% Mn, 81.77% $MnO_2$, and a conversion value of 1.93 with recovery of 85.7% of the original amount of $MnO_2$. The experiment can be run at 280° C. or 500° C. with virtually identical results.

EXAMPLE V

The mole ratio of NaOH to $MnO_2$ may be varied. For example, 7.0 g NaOH and 21.75 g pyrolusite (Fisher Scientific Co. C.P. grade) (0.7 mole NaOH:1.0 mole $MnO_2$) were intimately mixed and heated together at 500° C. for 2 hours, the precursor was then removed after cooling from the crucible, water washed until the effluent was free of color, treated to pH 2 with 15% $H_2SO_4$, water washed to remove excess acid, and dried overnight at 110° C. in air. The analysis of the final product was 56.48% Mn, 84.38% $MnO_2$, and a conversion value of 1.96; 86.0% of the original amount of $MnO_2$ was recovered.

EXAMPLE VI

Example 5 was rerun using an argon atmosphere and when the product was analyzed it contained 57.02% Mn, 81.88% $MnO_2$, and had a conversion value of 1.91. Recovery of the original amount of $MnO_2$ was 85.5%.

EXAMPLE VII

A portion of the sodium hydroxide can be replaced by sodium carbonate. For example, a mixture of 7.0 g NaOH, 3.98 g $Na_2CO_3$, and 21.75 g pyrolusite was heated at 500° C. for 2 hours. The mole ratio was therefore 0.7 NaOH:0.15 $Na_2CO_3$:1.0 $MnO_2$ or, expressed slightly differently, a sodium:manganese ratio of 1:1. The final product, after water washing, pH adjustment to pH 2 with 15% $H_2SO_4$, water washing to remove excess acid and drying was determined by analysis to contain 56.26% Mn, 83.77% $MnO_2$, and had a peroxidation of 1.95. The recovery of the original amount of $MnO_2$ was 89.72% which suggests a beneficial effect of sodium carbonate upon recovery of $MnO_2$ over the simple use of sodium hydroxide.

EXAMPLE VIII

The same experiment as described in Example VII was repeated at 360° C. for 4 hours and the final material contained 57.19% Mn, 83.84% $MnO_2$, and had a conversion value of 1.93. Manganese dioxide recovery was 90.3%.

EXAMPLE IX

This example illustrates the preparation of the manganese dioxide composition of this invention by the slurry method. 10 g NaOH, 10 g $H_2O$, and 21.75 g pyrolusite were mixed together to form a slurry in a nickel crucible. Two equal portions were heated at 500° C. for 2 hours and 280° C. for 16 hours. Upon cooling, water washing, acid treatment of each heated portion with $H_2SO_4$ to adjust the pH to 2, water washing and drying, products were obtained which contained 87.9% $MnO_2$.

EXAMPLES X–XVII

These examples as shown in Table IV illustrate the physical properties of the manganese dioxide composition of this invention at various Na:Mn molar ratios used in the preparation thereof.

The samples of the manganese dioxide composition in this table were made by the reaction (with NaOH) of an African battery grade $MnO_2$ containing about 75% $MnO_2$ where the Na:Mn ratios were based on this $MnO_2$ content. The reactants were mixed together in dry powder form and heated to a temperature of about 500° C. for about two hours, followed upon cooling, by acid treatment, washing with water and drying. The final pH of the samples is shown in the Table.

TABLE IV

| EXAMPLE | X | XI | XII | XIII | XIV | XV | XVI | XVII |
|---|---|---|---|---|---|---|---|---|
| Na:Mn | 1.3/1.0 | 1.1/1.0 | 1.0/1.0 | 0.9/1.0 | 0.8/1.0 | 0.75/1.0 | 0.7/1.0 | 0.5/1.0 |
| Mn (%) | 53.10 | 56.81 | 56.20 | 56.10 | 55.87 | 56.33 | 54.96 | 52.64 |
| $MnO_2$ (%) | 80.18 | 85.82 | 85.38 | 85.54 | 85.43 | 84.79 | 82.95 | 79.64 |
| Peroxidation (%) | 95.42 | 95.46 | 96.00 | 96.35 | 96.62 | 95.12 | 95.37 | 95.60 |
| 120° C. $H_2O$ (%) | 2.01 | 7.06 | 4.31 | 6.17 | 3.24 | 1.32 | 3.82 | 1.27 |
| 400° C. $H_2O$ (%) | 6.25 | 4.17 | 4.35 | 4.09 | 4.09 | 3.34 | 4.49 | 4.18 |
| Real Density (g/cm$^3$) | 3.58 | 4.28 | 4.29 | 4.25 | 4.22 | 4.24 | 4.15 | 4.02 |
| 6 pH-Potential (Volts) | 0.803 | 0.860 | 0.849 | 0.866 | 0.839 | 0.852 | 0.870 | 0.849 |
| Kerosene Absorption (ml/100gm) | 43.6 | 58.0 | 54.5 | 54.3 | 38.4 | 33.9 | 41.7 | 42.6 |
| Conductivity (mhos/cm) | $7.6 \times 10^{-6}$ | $2.40 \times 10^{-3}$ | $2.89 \times 10^{-3}$ | $2.24 \times 10^{-3}$ | $0.3 \times 10^{-3}$ | $1.3 \times 10^{-3}$ | $0.1 \times 10^{-4}$ | $2.8 \times 10^{-3}$ |
| Avg. Particle Size ($\mu$ at 50%) | 3.0 | 4.4 | 7.7 | 8.9 | 10.2 | 11.5 | 6.2 | —.6 |
| Surface Area (m$^2$/g) | — | — | 69.4 | 99.8 | — | 64.1 | 70.0 | 1 |
| Electrochemical Preformance (hrs) | | | | | | | | |
| 0.4 Volts* | 5.0 | 5.5 | 5.5 | 5.1 | 4.1 | 6.2 | 4.7 | 1.7 |
| 0.3 Volts* | 9.5 | 11.5 | 11.5 | 13.5 | 10.0 | 15.7 | 11.0 | 4.3 |
| 0.2 Volts* | 30.5 | 30.5 | 30.0 | 33.0 | 31.0 | 36.0 | 29.0 | 20.5 |
| 0.1 Volts* | 40.2 | 42.2 | 41.7 | 42.3 | 41.0 | 45.3 | 40.5 | 30.3 |
| Final pH | 6.65 | 3.5 | 3.65 | 4.1 | 4.25 | 4.5 | 4.1 | 4.1 |

TABLE IV-continued

| EXAMPLE | X | XI | XII | XIII | XIV | XV | XVI | XVII |
|---|---|---|---|---|---|---|---|---|
| Sodium content, weight % | 2.0 | 1.15 | 1.25 | 0.87 | 0.99 | 0.76 | 1.12 | 1.02 |

*Potential vs. SCE (Standard Calomel Electrode) as determined by the Kozawa and Powers test mentioned earlier.

EXAMPLES XVIII-XXIV

These examples as shown in Table V illustrate the physical properties of the manganese dioxide composition of this invention made by the slurry process using a minimum amount of water. Examples XVIII and XIX were made with a NaOH:MnO$_2$ ratio of 0.8:1 using 30 lbs. of an African battery grade MnO$_2$ containing about 75% MnO$_2$, 8.3 lbs. NaOH flake and 1208 ml H$_2$O. They were fired at 536° C. for 97 minutes and 405° C. for 52 minutes respectively. Examples XX and XXI were made with a NaOH:MnO$_2$ ratio of 0.75:1 using 30 lbs ore, 8.3 lbs NaOH and 1578 ml water. Firing temperature was 502° C. for 1 hour.

Examples XXII, XXIII and XXIV were made with a NaOH:MnO$_2$ ratio of 0.75:1 using 30 lbs ore, 8.3 lbs NaOH and 1575 ml water. The firing temperature was 438° C. for 1 hour.

The reaction product was treated upon cooling with aqueous H$_2$SO$_4$, washed with water and dried.

The final pH of the samples is shown in the Table.

TABLE V

| EXAMPLE | XVIII | XIX | XX | XXI | XXII | XXIII | XXIV |
|---|---|---|---|---|---|---|---|
| Mn (%) | 54.76 | 55.13 | 55.49 | 54.42 | 56.00 | 55.57 | 55.48 |
| MnO$_2$ (%) | 83.20 | 83.69 | 82.10 | 79.20 | 85.24 | 82.78 | 83.98 |
| Peroxidation (%) | 96.01 | 95.93 | 93.49 | 91.96 | 96.18 | 94.13 | 95.65 |
| 120° C. H$_2$O (%) | 2.20 | 3.78 | 3.61 | 0.99 | 1.91 | 2.82 | 2.79 |
| 400° C. H$_2$O (%) | 4.09 | 3.83 | 5.06 | 5.64 | 3.18 | 3.85 | 3.18 |
| Real density (g/cm$^3$) | 4.34 | 4.27 | 4.07 | 3.95 | 4.17 | 3.95 | 4.05 |
| 6 pH Potential (Volts) | 0.838 | 0.863 | 0.858 | 0.847 | 0.860 | 0.848 | 0.849 |
| Kerosene Absorption (ml/100gm) | 40.4 | 33.3 | 30.2 | 26.8 | 43.6 | 33.9 | 44.6 |
| Conductivity (mhos/cm) | 2.3 × 10$^{-3}$ | 1.4 × 10$^{-3}$ | 1.8 × 10$^{-4}$ | 2.9 × 10$^{-5}$ | 2.4 × 10$^{-3}$ | 3.5 × 10$^{-4}$ | 1.7 × 10$^{-3}$ |
| Avg. particle size (μ at 50%) | 8.2 | 7.5 | 9.2 | 7.4 | 13.5 | 7.2 | 18.4 |
| Electrochemical Performance (hrs) | | | | | | | |
| 0.4 Volts* | 4.8 | 4.8 | 5.1 | 4.0 | 4.3 | 5.0 | 5.3 |
| 0.3 Volts* | 12.5 | 11.0 | 11.8 | 10.0 | 10.4 | 12.3 | 12.5 |
| 0.2 Volts* | 33.5 | 30.2 | 35 | 32.3 | 33.7 | 38.0 | 37.7 |
| 0.1 Volts* | 42.5 | 38.0 | 44.0 | 42.7 | 44.0 | 45.7 | 45.3 |
| Final pH | 4.85 | 4.4 | 4.2 | 5.4 | 3.95 | 4.60 | 4.10 |

*Potential vs. SCE (Standard Calomel Electrode) as determined by the Kozawa and Powers test mentioned earlier.

Although the present invention has been described and set forth in some detail, it should be further understood that the same is susceptible of changes, modifications and variations without departing from the scope and spirit of the invention.

What is claimed is:

1. A method for producing a manganese dioxide composition for use as a battery cathode depolarizer comprising homogeneous manganese dioxide having domains of alpha and delta manganese dioxide as determined by X-ray diffraction patterns showing, at an intensity of I/I of 10 or more, "d" lines with at least the following values:
   about 6.91 to about 7.27,
   about 4.90 to about 4.98,
   about 2.40 to about 2.46 and
   about 1.41 to about 1.43, and
   having a combined sodium content of about 0.1 to about 2.0% by weight on a dry basis; and having sufficient electrochemical activity as a battery depolarizer according to the Kozawa and Powers test procedure to exhibit a voltage against a standard calomel electrode of at least +0.2 volt after a 30 milliamperehour discharge comprising the steps of:
   (a) reacting a sodium containing composition selected from the group consisting of sodium hydroxide, sodium carbonate, sodium oxide and mixtures thereof with a manganese-oxygen containing composition of a temperature in the range of from about 200° C. to about 600° C., in the mole ratio of sodium to manganese in the range of from about 0.3:1.0 to about 4.0:1.0; and
   (b) treating the reaction product with an aqueous acid in a concentration and amount sufficient to decrease the sodium content of the final manganese dioxide composition to an amount in the range of from about 0.1 to about 2.0% by weight on a dry basis.

2. The method of claim 1 wherein said manganese-oxygen containing composition is a mineral selected from the group consisting of pyrolusite, ramsdellite, nsutite, hollandite, cryptomelane, psilomelane, todorokite, chalcophanite, lithiophorite, birnessite, groutite, manganite, feitknechtite, pyrochroite, bixbyite, hausmannite, manganosite, rhodochrosite and mixtures thereof or a composition selected from the group consisting of manganese dioxide and manganese carbonate and mixtures thereof.

3. The method of claim 1 wherein said temperature is in the range of from about 280° C. to about 500° C., wherein said mole ratio of sodium to manganese is in the range of from about 0.5:1.0 to about 1.0:1.0 and wherein said sodium content is reduced to an amount in the range of from about 0.7 to about 1.25% by weight on a dry basis.

4. The method of claims 1, 2 or 3 comprising the additional step of cooling the reaction product of step (a) prior to step (b).

5. The method of claims 1, 2 or 3 comprising the additional step of cooling the reaction product of step (a) prior to step (b).

6. The method of claims 1, 2 or 3 comprising the additional step of:

(c) washing the acid treated product of step (b).

7. A manganese dioxide composition for use as a battery cathode depolarizer comprising homogeneous manganese dioxide having domains of alpha and delta manganese dioxide as determined by X-ray diffraction patterns showing, at an intensity of I/I. of 10 or more, "d" lines with at least the following values:

about 6.91 to about 7.27,
about 4.90 to about 4.98,
about 2.40 to about 2.46 and
about 1.41 to about 1.43, and
having a combined sodium content of about 0.1 to about 2.0% by weight on a dry basis; and having sufficient electrochemical activity as a battery depolarizer according to the Kozawa and Powers test procedure to exhibit a voltage against a standard calomel electrode of at least +0.2 volt after a 30 milliamperehour discharge.

8. The composition of claim 7 wherein said composition has a sodium content in the range of from about 0.7 to about 1.25% by weight on a dry basis.

* * * * *